United States Patent [19]

Itou

[11] Patent Number: 4,973,105
[45] Date of Patent: Nov. 27, 1990

[54] STRUCTURE OF VEHICLE SEAT WITH HEIGHT ADJUSTER

[75] Inventor: Kenichi Itou, Akishima, Japan

[73] Assignee: Tachi-s Co., Ltd., Tokyo, Japan

[21] Appl. No.: 429,432

[22] Filed: Oct. 31, 1989

[51] Int. Cl.$^5$ .............................................. A47C 1/02
[52] U.S. Cl. ................................... 297/345; 297/218; 297/452
[58] Field of Search .............. 297/345, 346, 452, 218, 297/219

[56] References Cited

U.S. PATENT DOCUMENTS

| 4,455,047 | 6/1984 | Watanabe | 297/457 X |
| 4,509,796 | 4/1985 | Takagi | 297/452 |
| 4,564,239 | 1/1986 | Akimoto | 297/452 |
| 4,580,037 | 4/1986 | Baycoy | 297/452 X |
| 4,580,840 | 4/1986 | Cunningham et al. | 297/452 |
| 4,784,437 | 11/1988 | Shimada | 297/452 |
| 4,798,416 | 1/1989 | Faust et al. | 297/452 |
| 4,834,458 | 5/1989 | Izumda et al. | 297/452 X |
| 4,861,104 | 8/1989 | Malak | 297/452 X |

FOREIGN PATENT DOCUMENTS 2201008 8/1988 United Kingdom ................ 297/452

Primary Examiner—Jose V. Chen
Attorney, Agent, or Firm—Browdy and Neimark

[57] ABSTRACT

A structure of a vehicle seat with a height adjuster, with a side cover attached laterally of a seat cushion of the seat, in which a side covering member is provided at one side of the seat cushion where the side cover exists in such a manner as to be disposed in a clearance between the side cover and side wall of the seat cushion. Even when the seat cushion is raised to a highest level by operation of the height adjuster, the side covering member still covers the clearance to thereby prevent an objectionable interior under the seat cushion from being exposed to view. Provision of an auxiliary frame around a forward half portion of seat cushion frame adds to the effect of such exposure prevention in cooperation with the side covering member, which also prevents the exposure from being viewed from forward side of the seat cushion.

6 Claims, 3 Drawing Sheets

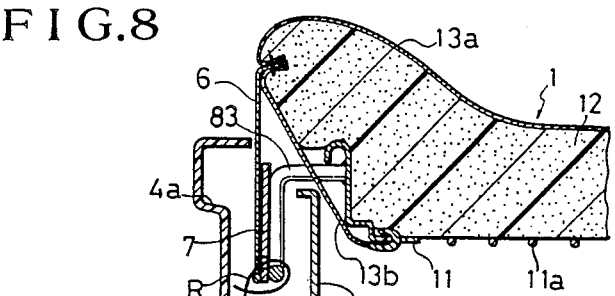
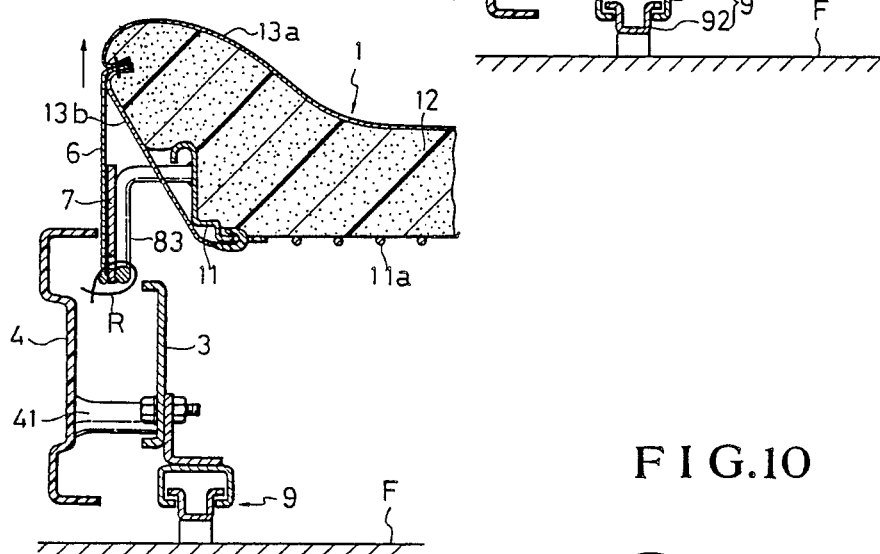
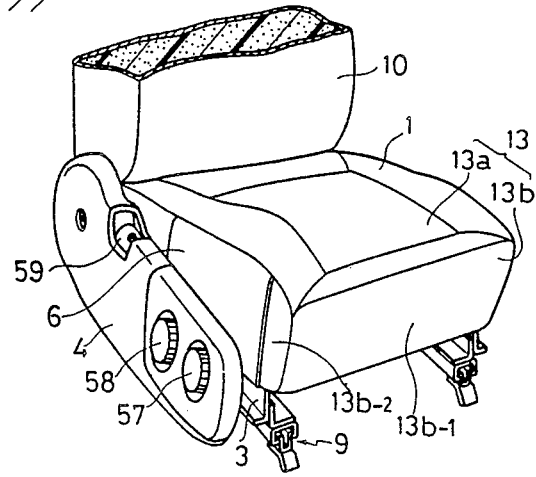

STRUCTURE OF VEHICLE SEAT WITH HEIGHT ADJUSTER

BACKGROUND OF THE INVENTION

1. Field of the Invention

The present invention relates to a vehicle seat provided with a height adjuster, and is particularly directed to a structure for such vehicle seat which is adjustable in seating height by operation of the height adjuster.

2. Description of Prior Art

A general structure of conventional seat with a height adjuster is shown in FIGS. 1 and 2 of the accompanying drawings.

The seat comprises a seat cushion (1') and seat back (10). Although not shown, the seat back (10) is rotatably connected via a reclining device with the rear end portion of the seat cushion (1') such that the seat back (10) are adjustably inclined forwardly and backwardly relative to the seat cushion (1') by means of the reclining device.

The seat cushion (1') is basically composed of a frame (11') of a pan type, a cushion member (12') mounted in the frame (11'), and a top cover member (13') which is stretched over both frame (11') and cushion member (12'), excepting the bottom of the frame (11'). The top cover member (13') is formed by a seating surface portion (13a') and side wall portion (13b'), both of which are sewn together at a peripheral corner of the seat (1'). The seating surface portion (13a') is affixed over the corresponding portion of the cushion member (12), defining a seating surface (1a') of the seat (1'), whereas the side wall portion (13b') is affixed over the corresponding portion of the cushion member and anchored at its lower end to the frame (11), thus defining a side wall (1b') of the seat (1').

Under the thus-formed seat cushion (1'), is provided a base bracket (3) which is fixed on the upper rail (91) of a slide rail (9), as shown. The slide rail (9) is adapted for adjusting the fore-and-aft position of the seat cushion (1'), and comprises a lower rail (92) and the upper rail (91), the lower rail (92) being fixed on the floor (F) of vehicle body and the upper rail (91) being slidably fitted in the lower rail (92).

Between the base bracket (3) and seat cushion (1'), is provided a height adjuster referred to as a "height adjusting mechanism" hereinafter and designated generally by (5), which is adapted for adjustably raising or lowering the seat cushion (1'). In brief, referring to FIG. 1, the height adjusting mechanism comprises a connecting rod (51), a link member (52) fixed on the connected rod (51), a bracket (53) fixed on the bottom of the seat frame (1), the lower free end of which bracket is pivotally connected with the free end of the link member (52), a sector gear (54) fixed on the connecting rod (51), a pinion gear (55) in mesh with the sector gear (54), a drive shaft (56) which passes through the base bracket (3) and a side cover (4) in a rotatable matter, the outer end of which drive shaft (56) is provided with an operation handle (57). The pinion gear (55) is fixed on the inner end of the drive shaft (56). The side cover (4) is fixed via a support bracket (41) to the outer planar surface of the base bracket (3) in such a manner as to be disposed laterally and longitudinally of the left-hand lateral side of the seat cushion (1'), base bracket (3) and slide rail (9), as viewed from FIG. 2. For the simplicity sake, description is made only on the left-side portion of the seat cushion (1') and those associated adjusting elements (4, 5 and 9), which are of course provided at the right-side portion of the seat cushion (1') though not shown. Thus, the connecting rod (51) is extended between a pair of spaced-apart base brackets and at both ends rotatably supported by them.

The rotation of the handle (57) causes simultaneous rotation of both drive shaft (56) and pinion gear (55), which in turn causes rotation of both sector gear (54) and connecting rod (51), to thereby rotate the vertical rotation of the link member (52). Accordingly, the seat cushion (1) is raised or lowered in response to such mechanical motions.

Designations (59) denote a reclining-device mounting area formed in the side cover (4) in which an operation part of a reclining device is to be mounted, and designations (57)(58) denote operation handles for operating the height adjusting mechanism, wherein although not shown the former is for adjusting the height of the forward part of the seat cushion (1') and the latter is for adjusting the height of the rearward part thereof. Having a good look at FIGS. 1 and 2, the side cover is formed with two recessed circular portions (4a)(4b) in which are disposed the two operation handles (57)(58) respectively, such that those handles (57)(58) is partly projected externally of the planar side surface of the side cover (4).

Now, the above-described prior-art seat structure is indeed positive in avoiding view of the interior under the seat cushion (1') when the seat cushion (1') is lowered at a lowest level by operation of the height adjusting mechanism (5), at which time, the side wall (1b') of the seat cushion (1') is in contact with the upper edge of the side cover (4), but in contrast, when the seat cushion (1') is raised to a higher level or highest level, as shown in FIG. 1, there comes up a clearance between the side side cover (4) and the bottom of the seat cushion (1'), resulting in the coming into view of the interior under the seat cushion (1') so that some mechanical elements are exposed to view through the clearance (L), impairing the outer aesthetic appearance of the seat and causing an objectionable feeling thereto.

SUMMARY OF THE INVENTION

With the above-stated drawbacks in view, it is therefore a primary purpose of the present invention to provide an improved structure for a vehicle seat with a height adjusting mechanism which avoids the creation of such clearance between the side cover and the side wall of the seat cushion, when the seat cushion is raised by operation of the height adjusting mechanism.

In accomplishment of the purpose, in accordance with the present invention, a side covering member is provided between the side cover and side wall of the seat cushion used in the foregoing prior art. Since all the constituent elements of the prior art seat are used as they are, the present invention provides an improvement thereto by attaching such side covering member to the seat seat cushion of the prior art. In other words, the side covering member is so fixed at the side wall of the seat cushion where is disposed the side cover that the side covering member extends between the side wall of the seat cushion and side cover, so as to prevent the interior under the seat cushion from being exposed to view. The dimensions of the side covering member are such as to sufficiently cover a maximum clearance which, when the seat cushion is raised at a highest level, is created between the side cover and seat cushion.

It is another purpose of the present invention to avoid a clearance between the side covering member and a side wall part of the covering member associated with the seat cushion.

To this end, substantially around the forward half portion of the frame used in the seat cushion, is provided an auxiliary frame of a generally U-shaped configuration, wherein one lateral frame section of the auxiliary frame which supports partly the side covering member extends along the corresponding side of the seat-cushion frame while the other lateral frame section thereof extends along the other corresponding side of the seat-cushion frame. Thus, the forward half portion of the covering member is stretched over the auxiliary frame, with the side covering member partly superposed upon the covering member, whereupon no clearance is created at the boundary between the side covering member and seat-cushion covering member.

In one aspect of the invention, the side covering member is at its upper end sewn with the seat-cushion covering member and extended tautly to be anchored at the lower ends of a support plate which supports the side covering member. Thus, no slack or wrinkle is created in the side covering member.

BRIEF DESCRIPTION OF THE DRAWINGS

FIG. 8 is a partial sectional view which shows the state wherein the seat cushion with the side covering member is lowered;

FIG. 9 is a partial sectional view which shows the state wherein the seat cushion with the side covering member is raised; and FIG. 10 is a partly broken perspective view of the seat in accordance with the present invention.

DETAILED DESCRIPTION OF PREFERRED EMBODIMENT OF THE INVENTION

Figures 1, 2, 3, 4:
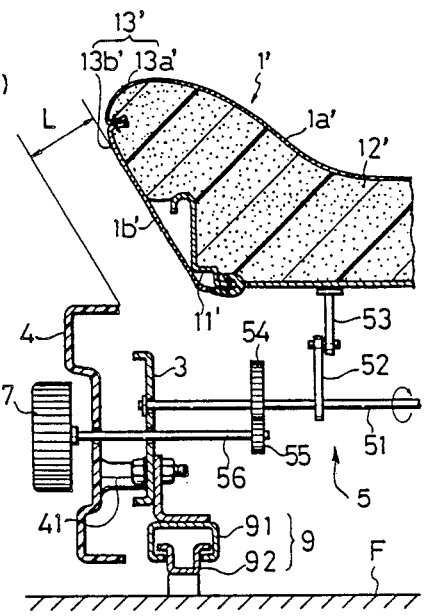
FIG. 1 is a sectional view of a conventional structure of a vehicle seat with a height adjusting mechanism.
FIG. 2 is a partly broken perspective view of the seat in the conventional structure.
FIG. 3 is a partly broken perspective view of a seat cushion with a side covering member in accordance with the present invention.
FIG. 4 is a perspective view of the seat cushion.
Figure 5:
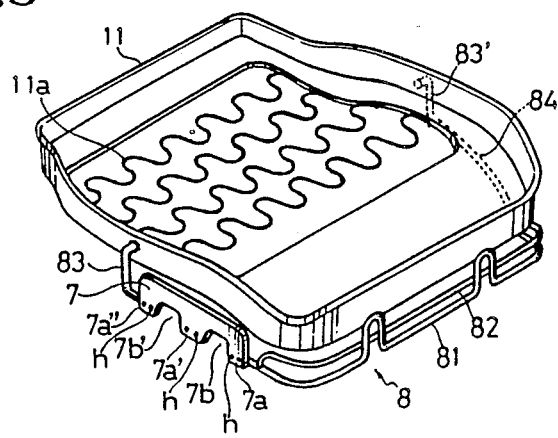
FIG. 5 is a perspective view of a frame for the seat cushion.

FIGS. 3 through 10 depict a preferred embodiment of the present invention, but as understandable from FIGS. 3, 4 and 5, the invention is drawn to providing an improved seat cushion on the basis of the conventional seat with the side cover (4) stated above with reference to FIGS. 1 and 2. Therefore, excepting a seat cushion (1) in this embodiment, all the constituent elements of the prior art are identical to those of the present invention, and like designations used in the herein description correspond to like ones in the foregoing prior art, with no restatement given to the corresponding parts between them.

As typically shown in FIG. 3, the seat cushion (1) is comprised of a seat-cushion frame (11) of a pan type, an auxiliary frame (8) of a generally U-shaped configuration, whose both vertical frame section sides extend along the respective both lateral frame sections of the seat-cushion frame (11) and whose horizontal frame section is disposed at the forward frame section of the frame (11), a foam cushion member (12) mounted on the seat-cushion frame (11), a covering member (13) stretched over those frames and cushion member (8)(11)(12) in a manner to be stated later, and a side covering member (6) made of a cloth which is provided at the side of thus-constructed seat (1) where the side cover (4) is located adjacently. Preferably, both covering member (13) and side covering member (16) are made of a same cloth material.

To get a more specific view of the structural features of the invention, each of the abovementioned elements will be elaborated hereinafter.

The auxiliary frame (8) includes a support plate (7) secured at its left-hand side and a pair of vertical end parts (83)(83') formed at its both ends. The frotal section of the auxiliary frame (8) is constructed in such a dual frame way that an upper frame member (82) extends in a spaced-apart and parallel relation with a lower frame member (81) with a view to stretching the corresponding part of the covering member (13) thereover with an even tautness. Preferably, as shown, the upper frame member (82) is welded at its both ends on the respective lateral frame sections of the lower frame member (81) and reinforced by the two inverted-U-shaped portions of the lower frame member (81) welded thereto. The support plate (7) is formed with a pair of distant cutaway areas (7b)(7b') at its lower side, thereby defining three dependent protrudent parts (7a)(7a')(7a''). Although not clearly shown, the support plate (7) may be welded on an inverted-U-shaped bent portion of the auxiliary frame (8) which is formed by bending the left-side lateral frame section thereof as such, or by cutting away such lateral frame section, the two cut ends thus attained in the frame (8) may be fixed on both lateral sides of the support plate (7) respectively. Both vertical end parts (83)(83') extend downwardly from their respective fixed points at both lateral walls of the seat-cushion frame (11) down to a lower level than the bottom of the seat-cusion frame (11) so that the lower frame member (8) as well as the support plate (7) and lateral frame section (84) are disposed below the seat-cushion frame (11) at such a lower level that causes the side covering member (6) to cover the clearance (L) as in FIG. 1, as will be explained later. Designation (11a) denotes a plurality of sinous springs extended within the seat-cushion frame (11). The lower frame member (81) is, of course, disposed at a same level with the lower edges of the support plate (7), which is essential in bringing the lower end of the corresponding part of the covering member (13) in registry with that of the side covering member (6).

As best seen from FIG. 4, the covering member (13) is formed in what can be described as a bottom-opened-box-like manner, comprising a seating surface portion (13a) and side wall portion (13b), both of them being made of a stretchable or elastic cloth material and sewn together at a sewn jointed point (s) corresponding to their boundary lines, with the terminal ends of the side wall portion (13b) being anchored to the lower ends of both seat-cushion and auxiliary frames (11)(8). More specifically, the left-side lateral part (13b-2) of the side wall portion (13b) is formed with a first incision (C1) and and second incision (C2). The first incision (C1) is defined in the forward area of the lateral part (13b-2) such that the forward portion of the support plate (7) is inserted in the first incisions (C1) whereas the vertical end parts (83) is inserted in the second incisions (C2), whereby the lateral part (13b-2) is neatly affixed over the left-hand side of the cushion member and seat-cushion frame (11)(12) and partly over the support plate (7).

Figure 6:
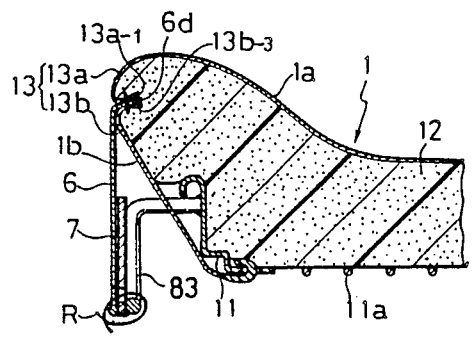
FIG. 6 is a partial sectional view taken along the line VI—VI in the FIG. 3.
Figure 7:
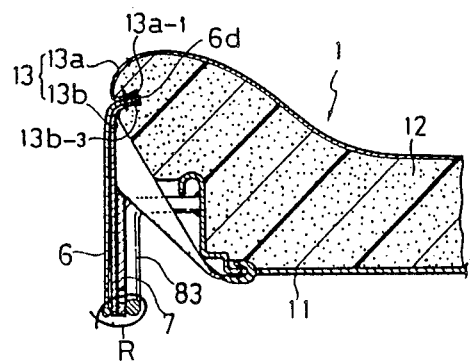
FIG. 7 is a partial sectional view taken along the line VII—VII in the FIG. 3.

The side covering member (6), as shown in FIGS. 3 and 4, is formed by cutting a cloth or other suitable material into the illustrated shape: The upper edge part (6a) is sewn in the sewn jointed point (S) so that, as in FIG. 6, the terminal ends (13a-1) (6d)(13b-3) respectively of the seating surface portion (13a), side covering member (6) and side wall portion (13b) are juxtaposed with each other in the corner of the cushion member (12) and sewn together, and the lower edge part of the side covering member (6) is formed with a pair of distant cut-away areas (6c)(6c'), defining three protrudent parts (6b)(6b') (6b''). It should be noted that those two cut-away areas (6c)(6c') and three protrudent parts (6b)(6b') (6b'') are generally identical in shape and dimensions to the aforementioned cut-away areas (7b)(7b') and protrudent parts (7a)(7a')(7a'') of the support plate (7), and that the lengthwise measure of the side covering member (6) is such as to cover the length of the support plate (7) plus the vertical end part (83) of the auxiliary frame (8), and the height-wise measure of the same member is such as to extend down from the upper end part (6a) to the lower edges of the support plate (7), whereby the side covering member (6) is substantially stretched over the left-hand side of the auxiliary frame (8) and partly superposed on the incised area of the lateral part (13b-2) associated with the covering member (13) where the first incision (C1) is defined, as can be seen from FIGS. 3, 4 and 7. Referring to FIGS. 3, 6 and 7, thus-formed side covering member (6) is anchored to the lower edges of the support plate (7) by means of the hog rings (R) at the holes (h): Namely, the lower edges of the three protrudent parts (6b)(6b') (6b'') of the side covering member (6) are respectively secured to those of the protrudent parts (7a)(7a')(7a'') of the support plate (7) by impaling the hog rings (R) into them through the holes (h) and anchoring the side covering member (6) to the support plate (7) securely.

The foregoing cut-away areas (6c)(6c')(7b)(7b') are formed at a dimensions greater than the outer diameter of the two recessed circular portions (4a) (4a') in which the operation handles (58)(57) are disposed, so as to permit the recessed circular portions (4a)(4a') to enter those cut-away areas, to thereby permit the seat cushion (1) to be lowered at a predetermined lowest level.

With the present invention constructed as above, as shown in FIG. 8, when the seat cushion (1) is adjusted its height at a lowest level by operation of the height adjusting mechanism, the side covering member (6) is also positioned at the lowest level within the clearance between the side cover (4) and the side wall portion of the seat cushion (1) in such a manner as to depend generally perpendicularly along the support plate (7) from the sewn jointed point (S) at the upper corner of the seat cushion (1) and bo positioned between the side cover (4) and base bracket (3). Accordingly, the side covering member (6) extends downwardly in a close proximity to the the inner side of the side cover (4), and the interior under the seat cushion as well as the base bracket (3) and mechanical elements of the height adjusting mechanism is prevented by such downward stretching of the side covering member (6) from being exposed to view. On the other hand, as shown in FIG. 9, when the height adjusting mechanism is operated to raise the seat cushion (1) to the highest level, the lower end part of the side covering member (6) is also raised up to the point in the vicinity of the upper end of the side cover (4) and stopped there, which still provides the stretching of the side covering member (6) over the clearance between the side cover (4) and the side wall of the seat cushion (1). Thus, from the left-hand side, any interior under the seat cushion is still prevented from being exposed to view by virture of the presence of the side covering member (6). Additionally, owing to the auxiliary frame (8), the forward portion of the covering member (13) is projected somewhat forwardly from the corresponding portion of the cushion member (12), which serves to forcibly stretch the forward part (3b-1) associated with the covering member (13) in a direction further forwardly and downwardly relative to the peripheral sides and bottom of the seat cushion (1) where the covering member (13) would normally be affixed over, should it be used for the previously stated prior-art seat. Accordingly, an objectionable view of the inteiror under the seat cushion (1) is prevented not only at the lateral sides but also at the forward sided of the seat cushion (1) in a more effective manner, thus contributing to the aesthetical apperance of the seat on the whole.

From the above descriptions, it is to be appreciated that the present invention is endowed with the following advantageous effects:

(i) The provision of the side covering member (6) is indeed effective in making up for the clearance (L) as found in the prior art, and extends fully in that clearance, so that a part of the clothing of an occupant on the seat is not caught in the clearance, eliminating thus a trouble of such kind for the safety purpose.

(ii) The inside of the side cover (4) as well as that of the side wall of the seat cushion (1) are covered with the side covering member (4) so that an objectionable interior under the seat cushion (10) are not viewed from the outside. Thus, there is eliminated such impairment to the outer aesthetic appearance of the seat.

Finally, while having described the present invention thus far, the invention is not limited to the illustrated embodiment, but any other modifications, replacements and additions may structurally be possible without departing from the scopes and spirits of the appended claims.

What is claimed is:

1. A structure of a vehicle seat with a height adjuster, comprising:

a pair of spaced-apart base support members fixed on a floor of the vehicle;

a seat cushion having a frame, wherein said frame is mounted via said height adjuster in said pair of spaced-apart base support members, in such a manner that said frame is disposed internally of said pair of spaced-apart base support members and is adjustably moved vertically relative to said base support members by operation of said height adjuster;

a side cover provided outwardly of said base support members with a clearance given therebetween;

an auxiliary frame extended from said frame of said seat cushion, the arrangement of said auxiliary frame being such that it extends downwardly into said clearance and is thus displaceable vertically between said side cover and base support member, with said vertical movement of said seat cushion frame being effected by said operation of said seat adjuster; and a covering means which is so arranged that its upper end is fixed to an upper part of a side wall of said seat cushion and its lower end is fixed to said auxiliary frame.

2. The structure as defined in claim 1, wherein said covering means comprises a side covering member made of a cloth material same with that of a covering member which covers an outer surface of said seat cushion.

3. The structure as defined in claim 2, wherein said covering member associated with said seat cushion comprises a seating surface portion and a side wall portion, both of said two portions being sewn together at their boundary lines, and wherein said side covering member is at its upper edge sewn to said boundary lines of said covering member in an integral manner.

4. The structure as defined in claim 1, wherein said base support means includes a slide rail device and base bracket fixed on said slide rail device, said slide rail device comprising a lower rail fixed on said floor and an upper rail fitted slidably in said lower rail for permitting a fore-and-aft adjustment of said seat, and wherein said seat adjuster is provided between said base bracket and seat cushion, and to said based bracket is supported said side cover via a support means.

5. The structure as defined in claim 1, wherein, a lateral frame section of said auxiliary frame, is fixedly provided with a support plate for supporting said covering means in a generally vertically state, to thereby be interposed within said clearance, whereby, when said seat cushion frame is lowered, said support plate is positioned between said side cover and base support member, whereas when said seat cushion frame is raised, said lower end part of said support plate is displaced and limited at an upper area in said clearance, so as to lay said covering means over said clearance, thereby still covering same to prevent an interior under said seat cushion from being exposed to view.

6. The structure as defined in claim 1, wherein said auxiliary frame extends around a half forward part of said seat cushion frame and a lower end portion of said auxiliary frame is disposed at a same level with a lower end part of said support plate, whereby a forward area of a covering member, which covers an outer surface of said seat cushion, is neatly stretched over said auxiliary frame, with a lower end part of said covering member being aligned with a lower edge of said covering member, thereby stretching said covering member around said seat cushion without a clearance and also preventing exposure of said interior from a forward side of said seat cushion.

* * * * *